Nov. 27, 1934.   W. F. MESINGER ET AL   1,982,474
AUTOMATIC PRESSURE RELIEF DEVICE
Filed March 28, 1933

INVENTORS
William F. Mesinger
BY Arthur C. Mattison
Watson, Bristol, Johnson & Leavenworth
ATTORNEYS Patented Nov. 27, 1934

1,982,474

UNITED STATES PATENT OFFICE 1,982,474

AUTOMATIC PRESSURE RELIEF DEVICE

William F. Mesinger, Flushing, N. Y., and Arthur C. Mattison, Hammond, Ind., assignors to The Linde Air Products Company, New York, N. Y., a corporation of Ohio Application March 28, 1933, Serial No. 663,174

4 Claims. (Cl. 137—53)

This invention relates to pressure relief devices and particularly to automatic pressure relief devices used to give relief from excess pressure upon the attainment of a predetermined value in connection with storage containers for liquefied gases where vapors under pressure may accumulate.

The invention has for its object to provide a pressure relief device of the character indicated which is safe, economical, readily manufactured, and serviced.

More particularly, the invention has for its object the provision of a relief device of the liquid seal variety for containers for liquefied gases of low boiling point, such as liquid oxygen, arranged in a manner not likely to become frozen or the pressure value at which relief occurs to alter through use, and which conserves the sealing liquid employed when relief takes place and restores the same to the device so that automatic resealing takes place when the pressure in the container has been reduced to the desired value.

Other objects of the invention will in part be obvious and will in part appear hereinafter.

The invention accordingly comprises the features of construction, combination of elements, and arrangement of parts, which will be exemplified in the construction hereinafter set forth and the scope of the application of which will be indicated in the claims.

Figure 1:
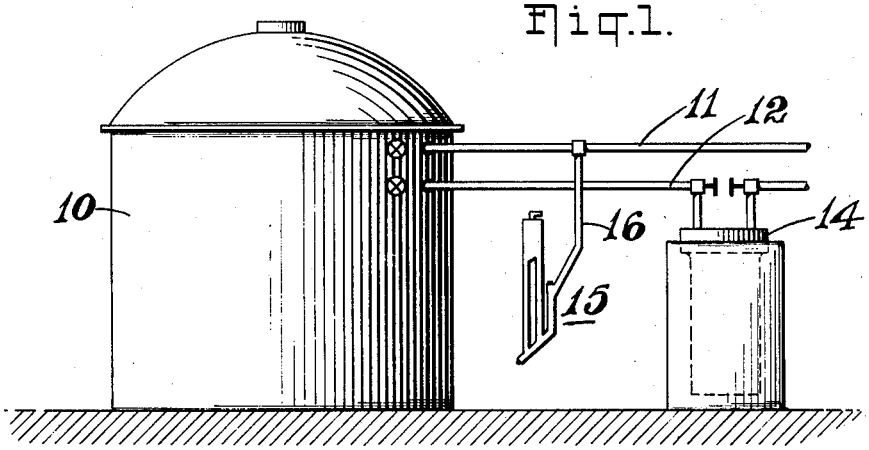
Figure 2:
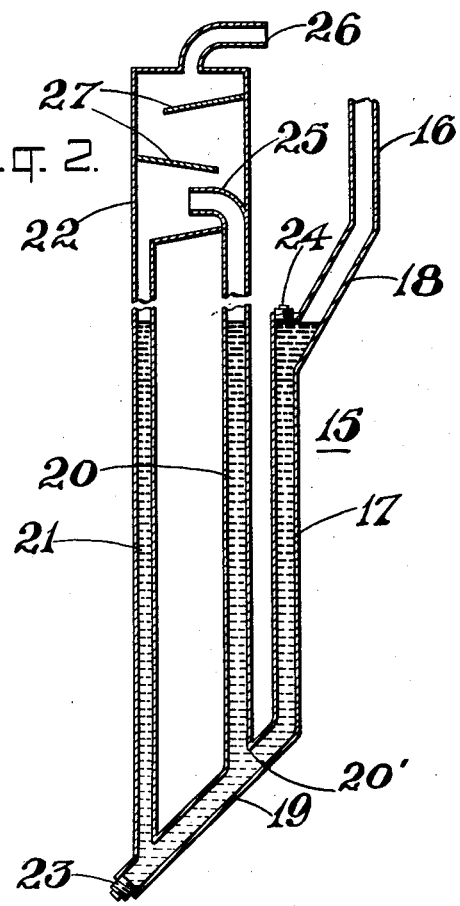

For a fuller understanding of the nature and objects of the invention, reference should be had to the following detailed description taken in connection with the accompanying drawing, in which:

Fig. 1 is an elevational view showing a container for liquefied gas used in connection with a vaporizing device and provided with a relief device constructed in accordance with the invention; and Fig. 2 is an enlarged vertical section of the relief device of the present invention shown in Fig. 1.

Referring to the drawing and particularly to Fig. 1, 10 denotes a storage container for liquefied gas of the heat insulated variety and has a gas phase withdrawal connection 11 and a liquid phase withdrawal connection 12 leading to a vaporizing device shown generally at 14. This vaporizing device may be of any convenient variety, for example, a closed vaporizing vessel adapted to absorb heat from a warming bath and generally styled a "warm converter." The relief device of the present invention is shown generally at 15 and is of the multi-leg liquid seal variety and is provided with a pressure connection 16 connected to the gas phase withdrawal connection 11, preferably at a sufficient distance to accomplish sufficient heating of the gaseous material which enters by way of connection 16 and actuates the device, so as to avoid freezing of the liquid employed in the device when the rate of flow is comparatively low.

In Fig. 2 the pressure relief device is shown as comprising a vertically extending pressure leg 17 which communicates with the connection 16 through an off-set or obliquely extending portion 18. Arranged parallel with the pressure leg 17 is a plurality of sealing legs that have common communication with the pressure leg through a base chamber 19. The sealing legs preferably comprise a main sealing leg 20 adjacent to the leg 17 and an auxiliary sealing leg 21 more distantly located from the pressure leg; the sealing legs being provided with a common head chamber 22.

The base chamber 19 may have any convenient arrangement, for example, it may be a tubular connection in the form of a continuation of the pressure leg 17. This base chamber preferably has an inclined wall through which the sealing legs 20 and 21 communicate with the interior. By this arrangement, the communicating orifices of the sealing legs are at different levels and cause these legs to perform their respective functions as hereinafter pointed out. The base chamber, when in the form of an inclined tube, as here shown, has its lower end preferably provided with a plugged liquid draining orifice, as indicated at 23. A filling opening, as indicated at 24, is placed in the leg 17 at a point which determines the precise height of the working liquid to be employed in the pressure relief device, the device being filled to the orifice of the opening.

The elevation at which the main sealing leg 20 communicates with the base chamber is higher than that of the leg 21 and causes the former to operate as the relief leg after liquid has risen in both legs until blow-off occurs. The leg 20 is advantageously provided with a hood or bent-over outlet connection 25 in the head chamber 22. The amount of liquid also determines the exact height to which liquid can rise in the relief device and thereby predetermines the value of the pressure at which relief occurs, and insures the device against any alteration in this pressure value during operation. The head chamber is formed with a vent 26 which may be down-turned, if desired, in order to provide an exit for the gas blown off. The exit of gas from the head chamber through the vent 26 preferably includes a tortuous passage leading to the vent. Accordingly, baffle means 27 are shown disposed in the head chamber above the hood 25 and arranged to form a tortuous passage for gas issuing from the hood before it passes out through the vent 26. The main sealing leg thus constructed projects a definite distance into the head chamber, and thereby enables the discharge of working material, when relief occurs, readily to clear the orifice of the main sealing leg; the auxiliary sealing leg, which communicates with the head chamber at a lower point in the bottom wall thereof, in consequence, serves as a receiving means for the liquid when discharged from the leg 20 in the head chamber.

The liquid displaced from the leg 17 by increasing pressure in container 10 must rise equally in the legs 20 and 21. These latter legs may be made with uniform diameters and have normal cross-sectional areas whose sum equals the normal cross-sectional area of the leg 17. When so proportioned, the displacement of the liquid level downwardly in leg 17 will be accompanied by an elevation of the liquid levels in legs 20 and 21 a distance equal to the downward displacement. The distance from the filling opening to the point of entrance 20' to leg 20 by this arrangement determines the pressure at which blow-off occurs. When this occurs, it is generally desirable that the proportions of the device shall be such that the liquid will have risen in the leg 20 to a point not greatly below the outlet afforded by the hood 25. The practice of the invention, however, is not limited to this and the use of proportions and dimensions other than those above indicated are contemplated.

When it is desired that the device shall give relief to a cold fluid at a rate of flow substantially equal to the capacity of the entrance connection 16, it is preferable that the cross-sectional areas of legs 20 and 17 be each equal to that of entrance conduit 16. The cross-sectional area of leg 21, however, may be less, so that the total volume of sealing fluid is reduced. The pressure at which relief first begins is then determined by the distance from the orifice 24 to the point 20' added to the distance that the fluid rises in legs 20 and 21 above the level of 24, which distance may be calculated by determining the length of the combined legs 20 and 21 required to accommodate the volume of fluid included between the levels of 24 and 20' in leg 17. When relief begins, the fluid will stand in legs 20 and 21 at a certain level above the level at 24. The legs 20 and 21 should be extended above this upper level until the sum of the volume of the leg 21 extending above this upper level and the volume of the chamber 22 from the point of entrance of leg 21 to the level of the lowest point of the opening of hood 25, is at least equal to the volume of liquid in leg 20 from the level of point 20' to the said upper level. When the device is constructed to have these proportions, it will release gas at the full capacity of the entrance conduit 16 without recirculating any of the sealing liquid, for the leg 20 will be free of fluid as the liquid will be held below the entrance to leg 20 in chamber 19 and in leg 21, and the lower part of chamber 22. The fluid released at the high rate will thus have an unobstructed exit and will come in contact with a relatively small amount of sealing liquid and thus substantially avoid freezing it if the fluid discharged should be very cold.

In operation, the relief device shown is cleaned and drained by opening the orifices at 23 and 24. To fill the device, the orifice 23 is closed and the sealing or working liquid, which may be mercury, is poured in until the level of the orifice at 24 is attained. This orifice is then closed, since no more liquid can be normally put in. The arrangement here employed permits inspection of the device, to see that a proper amount of working liquid is in the same, simply by opening and looking in the orifice at 24 whenever desired. When working liquid is poured into the leg 17 and the pressure in the container is substantially atmospheric, it rises not only in this leg to the level of the orifice at 24, but also in the legs 20 and 21 to the same level. If now, pressure in the container 10 increases above atmospheric, this pressure increase will be communicated through the connection 16 and cause the level of the liquid in leg 17 to descend with a consequent rise of the levels in the legs 20 and 21. When the predetermined pressure at which relief takes place has been substantially attained, the level in the leg 17 will have descended substantially to the entrance of the base chamber 19. Further increase in pressure will cause the gas in the leg 17 to depress the liquid surface to a point 20' where the gas finds entrance to the sealing leg 20. It will now pass up leg 20 as a bubble or push the liquid up and out through the hood 25. The liquid ejected from the hood 25 will flow into the leg 21. When sufficient gas has blown off through the sealing leg 20, the blown-off gas finding exit through the vent 26, while the baffles 27 operate to separate any liquid from the outgoing gas and conserve and return the same to the leg 21, the pressure in the container 10 will have been reduced to the desired value. The head of liquid then standing in the leg 21 will thereupon operate to force the return of liquid to the legs 20 and 17. The relief device of the present invention is thus seen to operate automatically to reseal the vent and prevent further escape of gas until the recurrence of an excess value of the pressure in the container 10, which will cause the device again to function.

Since certain changes may be made in the above construction and different embodiments of the invention could be made without departing from the scope thereof, it is intended that all matter contained in the above description or shown in the accompanying drawing shall be interpreted as illustrative and not in a limiting sense.

Having described our invention, what we claim as new and desire to secure by Letters Patent, is:

1. A pressure relief device comprising, in combination, a multi-legged chambered member having a filling of a desired quantity of working liquid, said member having a vertically extending pressure leg provided with a connection leading to a source of pressure, a main sealing leg, an auxiliary sealing leg in parallel relation to said main sealing leg, a common head chamber for said sealing legs into which said working liquid may discharge, and an inclined chamber connected in common with all of said legs at their bases, the points at which said legs connect with the said inclined chamber being such that there is a differential head of pressure respectively between the points at which said main sealing leg and said auxiliary sealing leg connect with said base chamber.

2. A pressure relief device comprising, in combination, a multi-legged chambered member having a filling of a desired quantity of working liquid, said member having a vertically extending pressure leg provided with a connection leading to a source of pressure, a plurality of sealing legs having a common head chamber, an inclined tubular chamber connected in common to the base of all of said legs, said pressure leg communicating with said tubular chamber at the highest point and said sealing legs communicating with said tubular chamber at points having respectively different lower levels, and discharge means at the lowest point of said tubular chamber.

3. A pressure relief device comprising, in combination, a multi-legged chambered member having a filling of a desired quantity of working liquid, said member having a vertically extending pressure leg provided with a connection leading to a source of pressure, a main sealing leg, an auxiliary sealing leg parallel to but at a distance from said main sealing leg, a common head chamber for said sealing legs having a tortuous passage for the exit of gases to the atmosphere, and a chamber having an inclined upper wall connected in common to the bases of all of said legs, said pressure leg communicating with said base chamber at the highest point, and said sealing legs communicating with said base chamber at points having respectively different levels.

4. A pressure relief device comprising, in combination, a multi-legged chambered member having a filling of a desired quantity of working liquid, said member having a vertically extending pressure leg provided with an offset portion leading to a source of pressure and formed with a filling opening at the juncture of said offset portion, a main sealing leg, an auxiliary sealing leg, a head chamber common to said sealing legs into which said main sealing leg projects a predetermined distance and provided with a tortuous passage for the exit of gas to the atmosphere, and a base chamber common to all of said legs having an inclined upper wall, the pressure leg having communication with said base chamber at the highest point, said main sealing leg communicating with said base chamber at an intermediate point, and said auxiliary sealing leg communicating with said base chamber at the lowest point.

WILLIAM F. MESINGER.
ARTHUR C. MATTISON.